(12) United States Patent
Iocco et al.

(10) Patent No.: US 7,891,159 B2
(45) Date of Patent: Feb. 22, 2011

(54) METHOD FOR POSITIONING A LOADED BAG IN A VACUUM CHAMBER

(75) Inventors: Jeffrey R. Iocco, Greenville, SC (US); Greg E. McDonald, Simpsonville, SC (US); Max C. Painter, Spartanburg, SC (US); Wayne T. Workman, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 67 days.

(21) Appl. No.: 12/156,137

(22) Filed: May 30, 2008

(65) Prior Publication Data

US 2009/0293430 A1    Dec. 3, 2009

(51) Int. Cl.
    *B65B 57/12*    (2006.01)
(52) U.S. Cl. .............. 53/504; 53/52; 53/66; 53/55; 53/450; 53/493; 53/432
(58) Field of Classification Search ........... 53/498, 53/500, 450, 452, 459, 428, 432–434, 52, 53/55, 493, 504, 64, 66
    See application file for complete search history.

(56) References Cited

U.S. PATENT DOCUMENTS

| | | | | |
|---|---|---|---|---|
| 3,958,391 | A * | 5/1976 | Kujubu | 53/434 |
| 4,147,930 | A | 4/1979 | Browne et al. | |
| 4,159,761 | A * | 7/1979 | Egee et al. | 414/788.5 |
| 4,446,481 | A | 5/1984 | Edamatsu et al. | |
| 4,580,393 | A | 4/1986 | Furukawa | |
| 4,640,081 | A | 2/1987 | Kawaguchi et al. | |
| 4,882,498 | A * | 11/1989 | Cochran et al. | 250/559.04 |
| 4,909,356 | A * | 3/1990 | Rimondi et al. | 186/61 |
| 5,165,218 | A * | 11/1992 | Callahan, Jr. | 53/447 |
| 5,313,766 | A * | 5/1994 | Rimondi et al. | 53/451 |
| 5,365,084 | A | 11/1994 | Cochran et al. | |
| 5,420,439 | A | 5/1995 | Landwehrkamp et al. | |
| 5,524,420 | A * | 6/1996 | Ikuta | 53/450 |
| 5,646,724 | A | 7/1997 | Hershline | |
| 5,799,465 | A * | 9/1998 | Townsend | 53/258 |
| 5,810,795 | A * | 9/1998 | Westwood | 604/305 |
| 5,941,052 | A * | 8/1999 | Evangelisti | 53/433 |
| 6,119,438 | A * | 9/2000 | Bacon et al. | 53/451 |
| 6,384,421 | B1 | 5/2002 | Gochar, Jr. | |
| 6,415,582 | B2 * | 7/2002 | Graushar et al. | 53/411 |
| 6,542,235 | B1 | 4/2003 | Caskey et al. | |
| 6,563,576 | B2 * | 5/2003 | Gschweitl | 356/237.1 |
| 6,725,635 | B2 * | 4/2004 | Koppe | 53/570 |
| 6,784,447 | B2 | 8/2004 | Gochar, Jr. | |
| 6,877,543 | B2 | 4/2005 | Stevens | |

(Continued)

*Primary Examiner*—Christopher Harmon
(74) *Attorney, Agent, or Firm*—Mark B. Quatt

(57) ABSTRACT

A method of positioning a loaded bag in a vacuum chamber includes loading a bag by placing a product in the bag; placing the bag on an infeed conveyor that is transparent to IR; advancing the bag, on the conveyor, to a sensing apparatus including an infrared camera disposed above the conveyor, and a bank of LED's disposed below the conveyor; interrogating the loaded bag, using the sensing apparatus, with infrared radiation to detect the trailing edge of the product inside the bag; transmitting information acquired from the interrogating step to a PLC; advancing the interrogated loaded bag a distance, based in the information acquired from the interrogating step, to a vacuum chamber including a heat seal assembly; and heat sealing the loaded bag with the heat seal assembly to close the bag mouth.

14 Claims, 9 Drawing Sheets

U.S. PATENT DOCUMENTS

| | | |
|---|---|---|
| 6,907,711 B2 * | 6/2005 | Ishii et al. ................. 53/54 |
| 7,296,390 B2 * | 11/2007 | Koke et al. ................ 53/510 |
| 2005/0039417 A1 * | 2/2005 | Liedtke et al. ............. 53/399 |
| 2005/0178090 A1 | 8/2005 | Koke et al. |
| 2005/0231713 A1 | 10/2005 | Owen et al. |
| 2006/0244954 A1 | 11/2006 | Daley et al. |

* cited by examiner

METHOD FOR POSITIONING A LOADED BAG IN A VACUUM CHAMBER

FIELD OF THE INVENTION

The present invention relates to a method for positioning a loaded bag in a vacuum chamber.

BACKGROUND OF THE INVENTION

Vacuum packaging in heat sealable plastic bags is a conventional way of packaging food products such as meat, and cheese. Vacuum packaging typically involves placing the food item in a heat sealable plastic bag having a bag mouth, and then evacuating air from the bag through the bag mouth and collapsing the bag about the contained food item. The bag is then heat sealed in its evacuated condition so the food item becomes encased in a generally air-free environment. Often the bag is a heat shrinkable bag, and after the heat sealing step, is advanced to a hot water or hot air shrink tunnel to induce shrinkage of the bag around the food item.

Vacuum packaging machines of a known type include a vacuum chamber arranged to receive unsealed loaded bags and operable to perform a vacuum sealing operation on the loaded bags. Typically the loaded bags contain products such as meat cuts, arranged in bags formed by a heat-shrinkable film. After feeding a loaded bag to a vacuum chamber and closing the vacuum chamber, the vacuum sealing operation typically includes vacuumization, sealing the mouth of the vacuumized bags, and reintroducing air into the chamber. The chamber is then opened and the vacuum chamber is unloaded. In some applications, the packages may then be conveyed to a heat-shrinking unit to shrink the packaging around the product.

Rotary vacuum packaging machines are known, which include a series of vacuum chambers and chain driven product platens. In operation of the machine the platens move from a loading position, through a vacuum/sealing/venting stage, to an unloading position, and finally back to the loading position. Typical are the packaging machine and machine systems developed by Furukawa Manufacturing Co., Ltd., and disclosed in U.S. Pat. No. 3,958,391 (Kujubu), U.S. Pat. No. 4,580,393 (Furukawa), and U.S. Pat. No. 4,640,081 (Kawaguchi et al.), all incorporated herein by reference in their entirety.

U.S. Pat. No. 7,296,390 (Koke et al.), this patent incorporated herein by reference in its entirety, discloses a vacuum packaging machine including a plurality of vacuum chambers each arranged to receive at least one unsealed loaded bag, and operable to perform an independent vacuum sealing operation, each vacuum chamber having a longitudinal direction defined by a direction of travel of the respective loaded bag through the chamber, each chamber having a heat seal assembly therein which extends transversely to the longitudinal direction. An infeed conveyor is provided for feeding an unsealed loaded bag to a vacuum chamber, such that the trailing (upstream) end of the unsealed loaded bag extends over the heat seal assembly or a part thereof. Each vacuum chamber has a respective bed and independently moveable hood, and the beds can be synchronously vertically moveable. The vacuum packaging machine can be used in combination with a suitable product bagging or wrapping machine.

The system disclosed in U.S. Pat. No. 7,296,390 has been commercialized in New Zealand as the TASVAC™ vacuum packaging system for packaging bagged meat products. In this system, it is beneficial to arrange the trailing (i.e. upstream) edge of each bagged product such that, after heat sealing to close the bag mouth, a bag tail (the portion of the sealed bag located between the trailing edge of the bagged product, and the heat seal) of no more than about two inches (50.8 millimeters) is left on the bag. Bag tails longer than this, e.g. longer than 2 inches (50.8 millimeters), result in use of excessive amounts of thermoplastic materials making up the bag, and also are less aesthetic than bags with shorter bag tails. It is beneficial to have a bag tail less than about 1.5 inches (about 37.6 millimeters), such as one inch (25.4 millimeters) left on the bag. It is also important to have enough bag tail to accommodate irregularly shaped meat cuts, in particular those with a high vertical profile. Put differently, the margin of error for positioning the trailing edge of each product, with respect to the position of the heat assembly, is beneficially a maximum of plus or minus 1.5 inches (about 37.6 millimeters), such as one inch (25.4 millimeters).

Thus, for the TASVAC™ system, in packaging a series of bagged meat products queued on and being advanced by an in-feed conveyor e.g. in a meat processing plant, it is desirable to determine their position vis-à-vis a downstream vacuum chamber, so that each bag can be properly aligned with the heat seal assembly as the loaded bag advances to and inside the vacuum chamber.

Capacitive sensors, positioned upstream of the vacuum chambers on the common in-feed conveyor, have been tested and proven to be unreliable in determining the position of the trailing edge of a product positioned in an unsealed bag, prior to advancing of the bagged product into a given vacuum chamber. This is in part because capacitive sensors rely on the detection of moisture in the meat product being packaged. In a typical meat processing plant, where various meat cuts are being packaged in thermoplastic bags, moisture is commonly present on meat conveyors in the form of water or blood. Use of capacitive sensors therefore sometimes gives a "false positive" indication of the presence of the meat product, such that proper advancement and positioning of each bagged product with respect to the heat seal assembly of a downstream vacuum chamber is difficult and unreliable. In addition, the capacitive sensor has a maximum sensor height range of typically about 40 millimeters.

A product sensor used in the above described apparatus and process should be able to identify product, that is, identify the trailing edge of the product as the product advances along an in-feed conveyor, or is positioned on an in-feed conveyor. The sensor should be able to make such identification for products ranging from thin cuts of veal to thick cuts of fresh red meat to cheese blocks, and should be able to make such identification through clear, printed, and colored bags. Many of these cuts will incorporate odd shapes and profiles. The sensor should also be able to withstand the harsh production environments in meat and cheese packaging plants. The overall cost of the product detection system must be considered as well.

The present invention provides a method for positioning an unsealed loaded bag in a vacuum chamber. The invention enables the sealing of the upstream end of a polymeric bag having therein a product, such as an irregularly shaped meat product, while the loaded bag is in a vacuum chamber, in a manner that provides a bag tail of consistently suitable length.

SUMMARY OF THE INVENTION

In a first aspect, a method of positioning a loaded bag in a vacuum chamber comprises loading a flexible polymeric bag by placing a product in the flexible polymeric bag, the bag made from a material that is transparent to infra-red radiation, and wherein the polymeric bag has at an upstream end thereof a bag mouth;

placing the loaded bag on an infeed conveyor that is transparent to infrared radiation;

advancing the loaded bag, on the infeed conveyor, to a sensing apparatus comprising an infrared camera disposed above the conveyor, and a bank of light emitting diodes disposed below the conveyor;

interrogating the bank of light emitting diodes, through the loaded bag, using the sensing apparatus, with infrared radiation to detect the trailing edge of the product inside the loaded bag;

transmitting information acquired from the interrogating step to a programmable logic controller;

advancing the interrogated loaded bag a distance, based in the information acquired from the interrogating step, to a vacuum chamber comprising a heat seal assembly; and heat sealing the loaded bag with the heat seal assembly to close the bag mouth.

In one embodiment, the method as described above comprises heat sealing the loaded bag such that the distance between the heat seal and the trailing edge of the product is less than 1.5 inches.

In another embodiment, the method as described above comprises heat sealing the loaded bag such that the distance between the heat seal and the trailing edge of the product is less than 1 inch.

In another embodiment, the method of positioning a loaded bag in a vacuum chamber as described above is performed in combination with a method of vacuum sealing a loaded bag, the method comprising providing a vacuum packaging machine having a plurality of vacuum chambers, each of the vacuum chambers being arranged to receive an unsealed loaded bag and operable to perform a vacuum sealing operation on the loaded bag, each vacuum chamber having a longitudinal direction defined by a path of travel of the respective loaded bag through the chamber, each vacuum chamber having a heat seal assembly for forming a heat seal across a bag mouth of a respective loaded bag, the heat seal disposed transversely to said longitudinal direction; feeding an unsealed loaded bag into one of the vacuum chambers, such that the bag mouth of the loaded bag is located over a portion of the heat seal assembly; and performing a vacuum sealing operation on a loaded bag in another one of the vacuum chambers.

In another embodiment, the method of positioning a loaded bag in a vacuum chamber as described above includes the step of placing a meat product in a flexible polymeric bag, wherein the meat product has an irregular shape.

BRIEF DESCRIPTION OF THE DRAWINGS

Embodiments of the present invention will now be described with reference to the accompanying figures, in which.

DETAILED DESCRIPTION OF THE INVENTION

Figure 1:
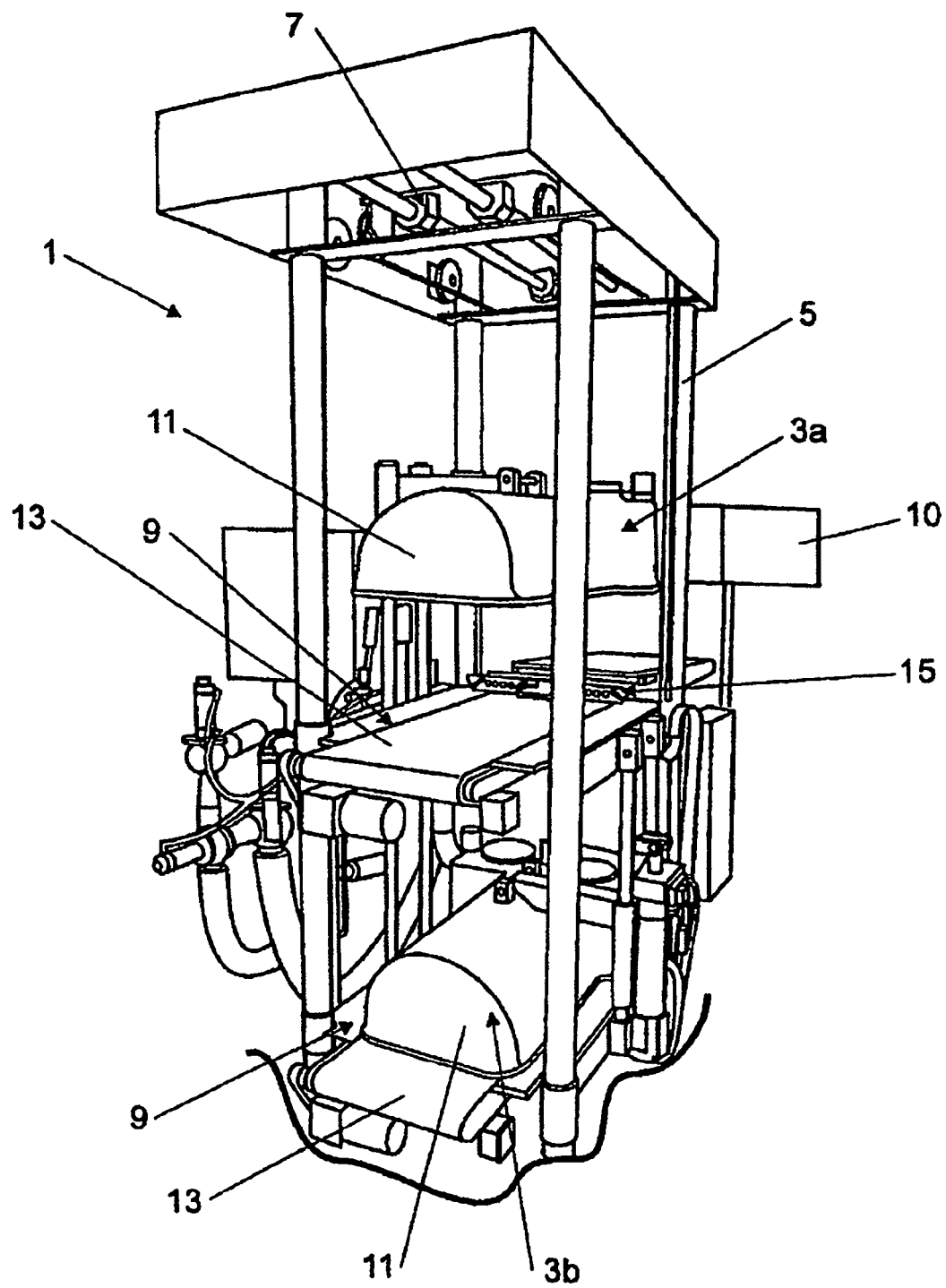
FIG. 1 is a perspective view of a prior art vacuum packaging machine.
Figure 2:
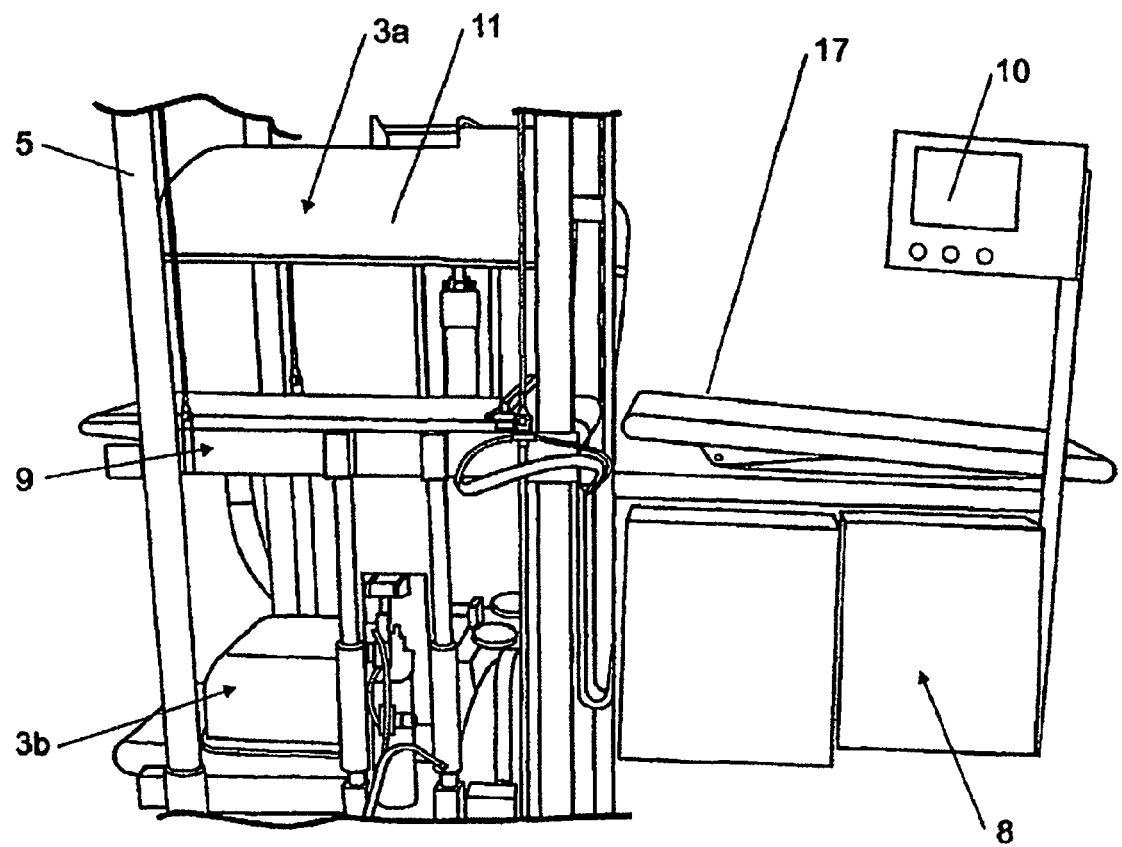
FIG. 2 shows a side elevational view of a prior art vacuum packaging machine.
Figure 3:
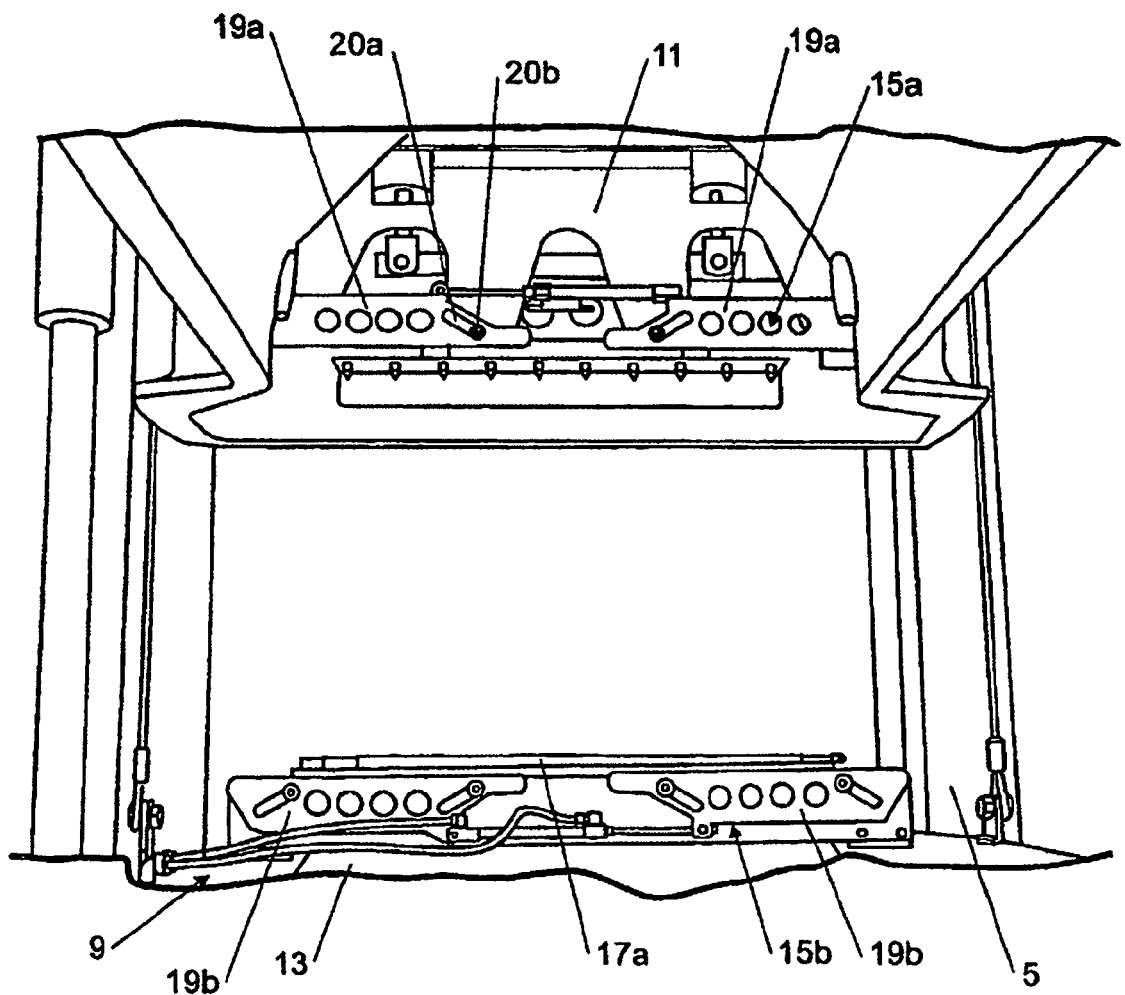
FIG. 3 is a view of the interior of a prior art vacuum chamber, showing a sealing assembly.
Figure 4:
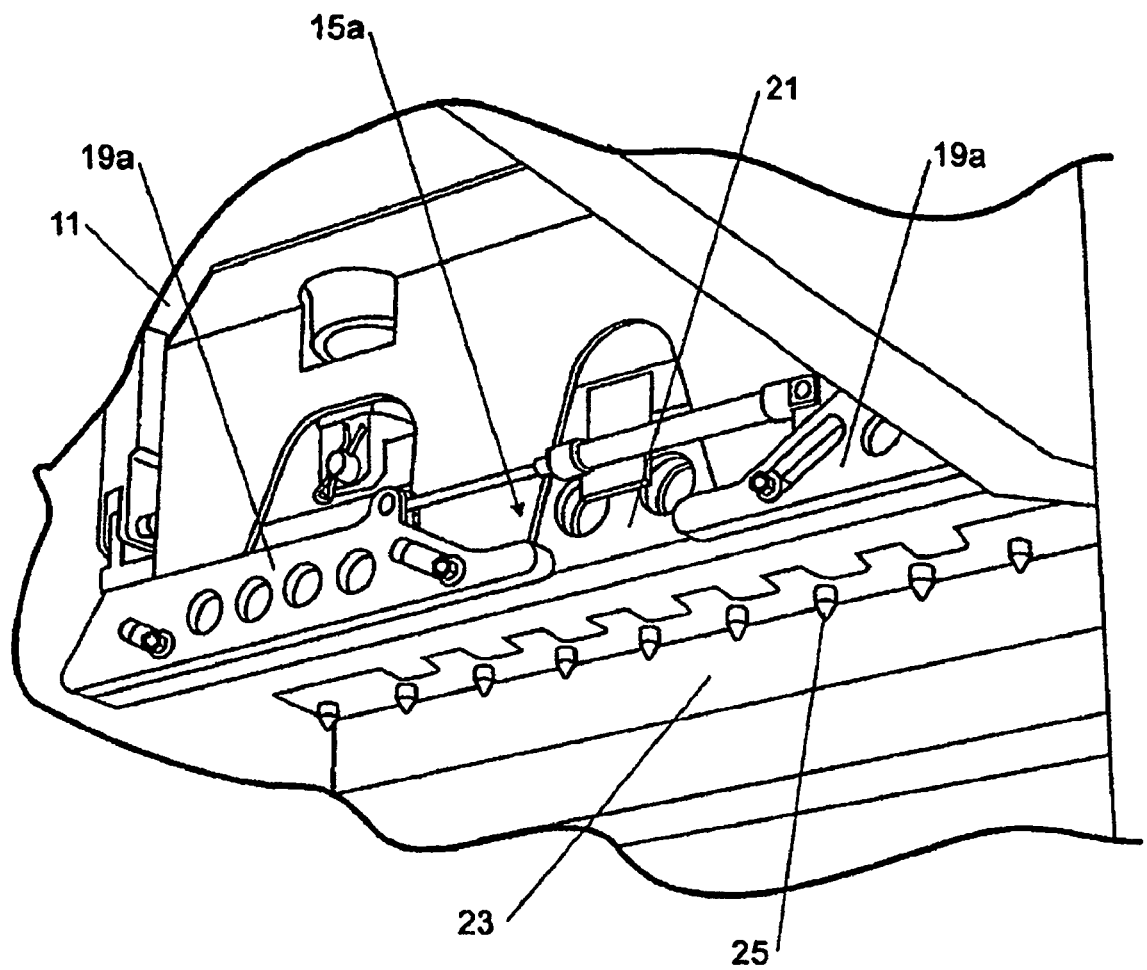
FIG. 4 is a perspective view of the upper interior of a vacuum chamber, showing the details of the upper part of the sealing assembly of FIG. 3.
Figure 5:
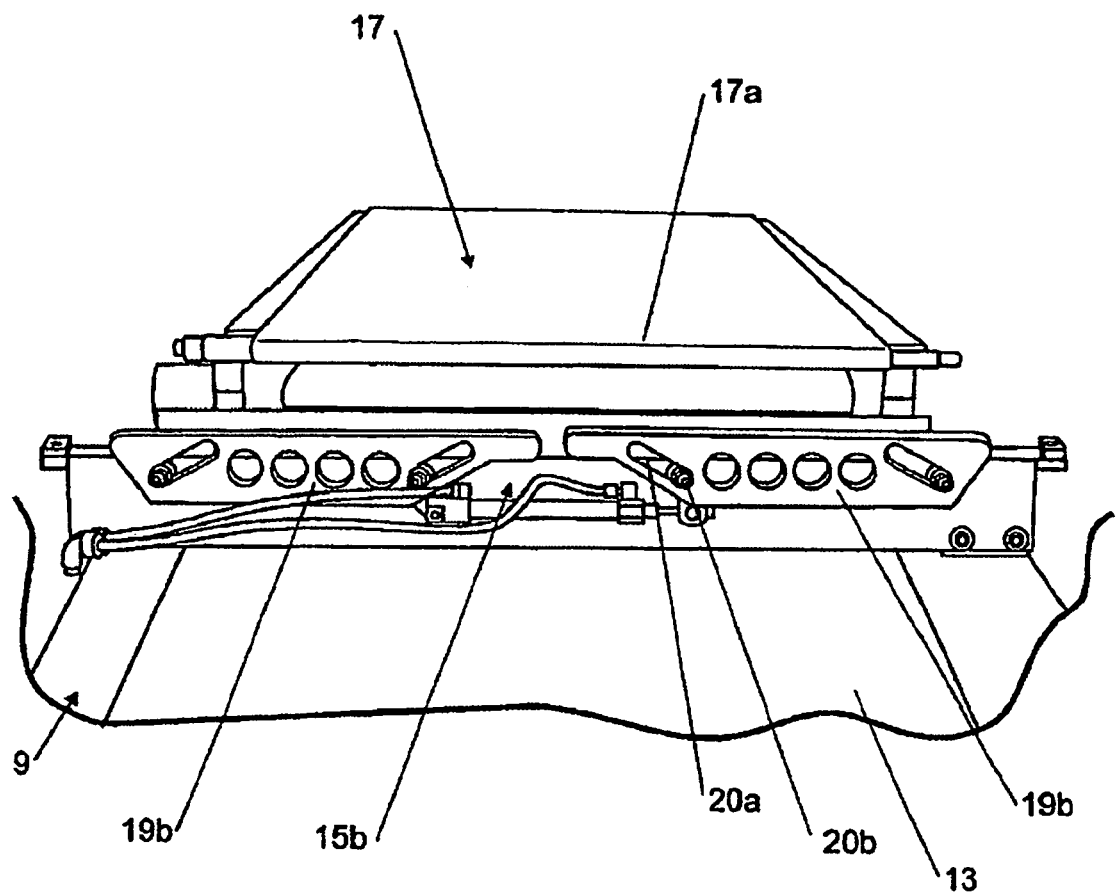
FIG. 5 is a view of the lower part of a vacuum chamber, showing details of a lower part of the sealing assembly of FIG. 3.
Figure 6:
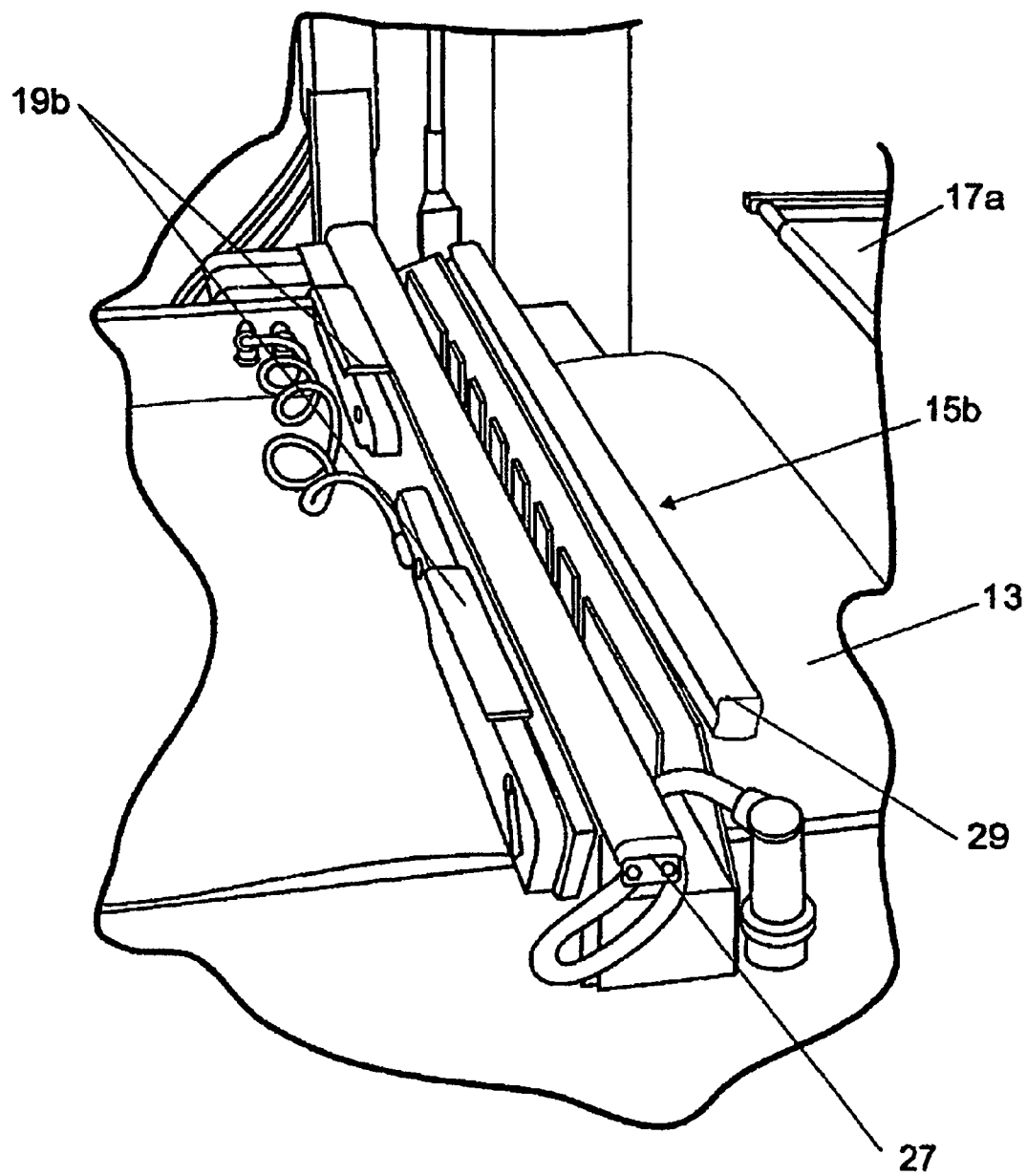
FIG. 6 is a perspective view of the lower part of the sealing assembly of FIG. 3.

With reference to FIGS. 1 and 2, an embodiment of a vacuum packaging machine suitable for use in connection with the present invention is indicated generally by reference numeral 1. The vacuum packaging machine includes upper and lower vertically stacked vacuum chambers 3a,3b, which are vertically moveably mounted between columns 5. Mounted adjacent the tops of the columns 5 is a drive mechanism 7 for the vacuum chambers 3a, 3b.

An electronic control system 8 controls operation of the machine 1, and a keypad/monitor 10 is provided to enable a user to program the control system.

Each vacuum chamber 3a, 3b includes a bed 9 and a chamber hood 11. The beds 9 are synchronously vertically movably mounted between the columns 5, and each chamber hood 11 is vertically moveable relative to the respective bed 9. The chamber hoods 11 are moved via any suitable motive device, e.g. pneumatic rams, hydraulic rams or mechanical drive devices.

Each vacuum chamber has a sealing assembly 15 therein, described below with reference to FIGS. 3 to 6. The bed 9 of each vacuum chamber includes an internal conveyor 13 to convey packaged product out of the chamber after it has been vacuum sealed, the direction of travel of the conveyor 13 defining a longitudinal direction of the vacuum chamber.

A conveyor arrangement is provided to feed/unload loaded bags to/from the vacuum chambers. The conveyor arrangement includes an infeed conveyor 17 to feed loaded bags into the vacuum chambers. An optional outfeed conveyor (not shown) is also provided to remove a sealed loaded bag from the machine following sealing.

The vacuum chambers are moveable together between a lower position (shown in FIGS. 1 and 2) wherein the upper chamber 3a is adjacent the infeed conveyor 17 for feeding and unloading, and an upper position (not shown) wherein the bed of the lower chamber 3b is adjacent the infeed conveyor 17 for feeding and unloading. While one of the vacuum chambers is in the feeding/unloading position, the other chamber is in an operating position to perform a vacuum sealing operation on the loaded bag contained therein. Therefore, the operating position for the upper vacuum chamber 3a is above the level of the infeed conveyor, while the operating position for the lower vacuum chamber 3b is below the level of the infeed conveyor.

As can be seen from FIGS. 3 to 6, the sealing assembly 15 in each vacuum chamber includes an upper part 15a and a lower part 15b. The sealing assembly 15 extends transversely to the longitudinal direction of the vacuum chamber, and therefore to the direction of travel of loaded bags through the chamber. This enables the loaded bag to be delivered to the vacuum chamber with its unsealed portion trailing, which is the orientation in which the loaded bag would exit from prior bagging/wrapping stations.

The upper part 15a of the sealing assembly includes a pair of upper spreaders 19a, a heat seal anvil 21, a puncturing device having a plurality of piercing knives (not shown), and a clamping device 23 having a series of clamping pins 25. The lower part 15b of the seal assembly includes a pair of lower spreaders 19b which are complementary to the pair of upper spreaders 19a, a heat seal bar 27, and a lower clamp bar 29. It will be appreciated that the anvil could be provided in the lower part 15b of the seal assembly, with the heat seal bar provided in the upper part 15a of the seal assembly.

In this embodiment, the spreading operation is as follows. The spreaders 19a, 19b are operable to grip and spread the unsealed part of the loaded bag prior to heat sealing. As will be apparent from the Figures, as the upper 19a and lower 19b spreaders are brought together, they move outwardly by virtue of the angled slots 20a and pins 20b extending therethrough. The spreaders function in a similar way to those described in U.S. Pat. No. 6,877,543 (Stevens), incorporated herein by reference in its entirety.

The clamping pins 25 and lower clamp bar 29 (which would generally be made from a resilient material such as rubber) maintain the unsealed portion of the package in the spread configuration, and provide tension on the loaded bag such that it can be pierced. When the puncturing device is actuated, the knives (not shown) pierce the package. The puncturing device forms small apertures in the loaded bag. During feeding of the loaded bag into the vacuum chamber, it is feasible that the trailing unsealed portion of the loaded bag may be located such that it will be clamped under the end wall of the vacuum chamber hood 11 when it is closed. The apertures formed by the puncturing device ensure that any air in the loaded bag may still be evacuated if this should occur.

The heat seal anvil 21 is operable to push against the heat seal bar 27 with the unsealed portion of the loaded bag therebetween, applying a current to the heat seal bar and sealing the loaded bag.

Although not shown in the Figures, a suitable cutting device is provided to cut the loaded bag between the heat seal bar 27 and the puncturing device. An example of a cutting device is a serrated knife, which is arranged to move downwards from above to shear the loaded bag.

The belt of the conveyor 13 extends under the lower part of the seal assembly 15b, and around the outer ends of the bed 9 of the vacuum chamber. For this purpose, the undersurface of the conveyor belt comprises a smooth surface (relative to a conventional cloth surface), for example a smooth elasticized surface, such that the vacuum chamber can seal over the belt.

In order to deliver the loaded bag over the lower part 15b of the seal assembly, the infeed conveyor 17 has in one embodiment a telescoping portion 17a. During feeding the loaded bag into an open vacuum chamber, the telescoping portion 17a extends over the lower part 15b of the seal assembly, and is operated to drop the body of the loaded bag onto the conveyor 13 on the bed 9 of the vacuum chamber. The trailing unsealed portion of the loaded bag will remain located on the telescoping portion 17a of the infeed conveyor. As the telescoping portion 17a is retracted away from the vacuum chamber so that the vacuum chamber can be moved and closed, the trailing unsealed portion of the loaded bag will drop onto the lower part 15b of the seal assembly, so that the unsealed portion can be spread and sealed. The seal assembly 15 is relatively low profile to minimize the product drop distance as the telescoping portion 17a of the conveyor is extended into the vacuum chamber.

Figure 7:
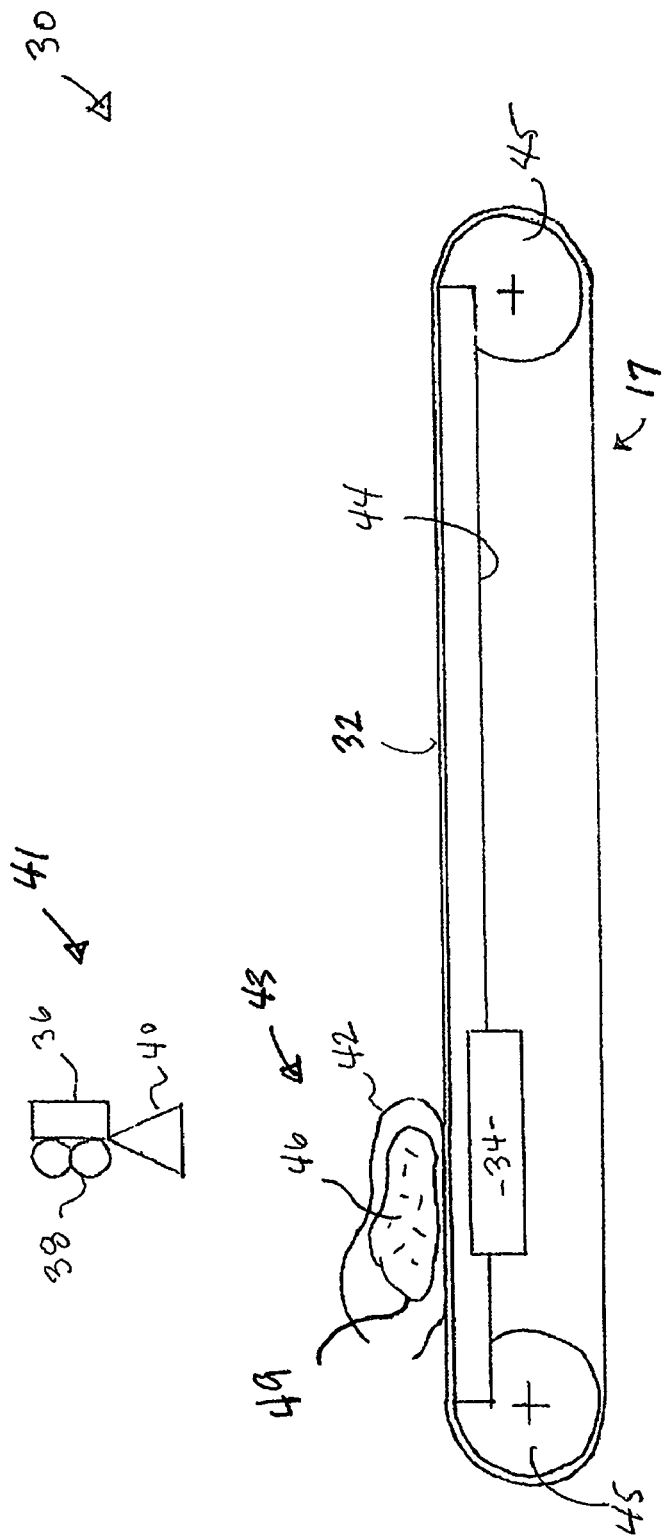
FIG. 7 shows schematic side elevational view of an apparatus for use in connection with the method of the invention.

FIG. 7 shows a schematic view of an apparatus 30 for use in carrying out the method of the invention. The apparatus 30 includes an infeed conveyor 17 having a conveyor belt 32, a bank of light emitting diodes (LED's) 34 positioned beneath conveyor belt 32, and infrared (IR) camera 36, an infrared filter 38, and a camera lens 40. The camera, LED's, filter and lens together comprise a sensing apparatus 41. The IR camera lens 40 is in one embodiment positioned vertically above the bank of light emitting diodes 34. An unsealed bag 42 is shown, loaded with a meat product 46 to form an unsealed loaded bag 43. The unsealed loaded bag 43 is in one embodiment advanced on infeed conveyor 17 described hereinabove.

A commercial example of a conveyor belt 32 useful in connection with the present invention is the VOLTA™ FELW-2.0 available from Ammerall Beltech, Inc. In one embodiment, the belt is a homogeneous urethane belt. The belt is routed around the conveyor platen 44 by end rollers 45, at least one of which is motor driven. The conveyor platen 44 houses the bank of LED's 34. The bank of LED's 34 includes four sets of infrared lights. A commercial example of LED's is the LEDIA80X80W™ available from Banner Engineering Corp. 9714 Tenth Avenue North, Minneapolis, Minn., USA 55441.

The IR camera is mounted at a sufficient height, in one embodiment 20 inches above the conveyor belt 32, to view the necessary viewing area in conjunction with the appropriate light filter 38 and camera lens 40. A commercial example of an IR camera is PRESENCEPLUS™ P4AR. A commercial example of an IR filter is FLT1™. A commercial example of a lens is LCF04™ P4AR. All three are available from Banner Engineering Corp. The IR camera can be mounted at any suitable height above the conveyor belt 32, e.g. from 5 inches to 30 inches, 10 to 25 inches, or 15 to 20 inches above conveyor belt 32. The lower limit will be dictated at least in part by the height of the product being packaged, the upper limit by the capabilities of the camera, and the overall packaging environment in which the sensing apparatus is located.

Figure 8:
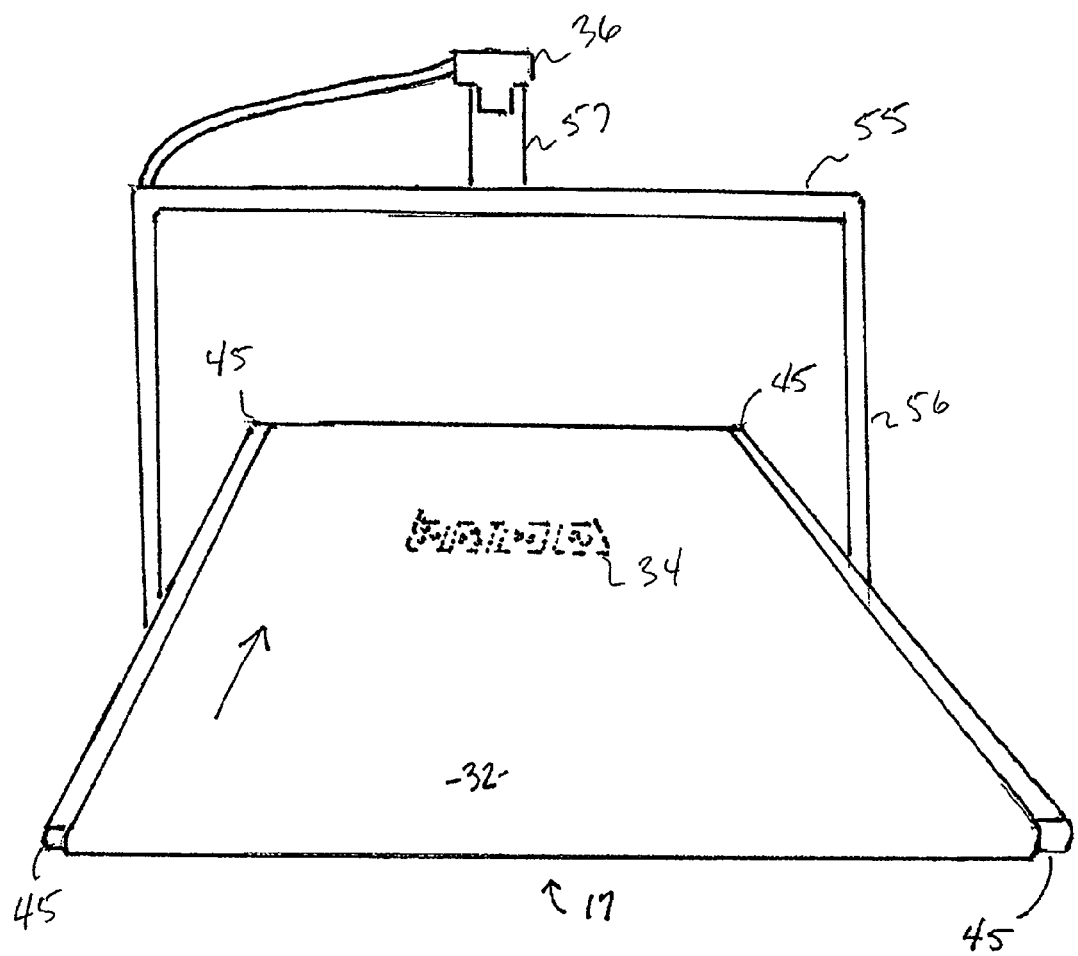
FIG. 8 shows a simplified end elevational view of an apparatus for use in connection with the method of the invention.

FIG. 8 shows the apparatus 30 when viewed from upstream of the infeed conveyor 17, looking downstream toward a vacuum chamber.

Figure 9:
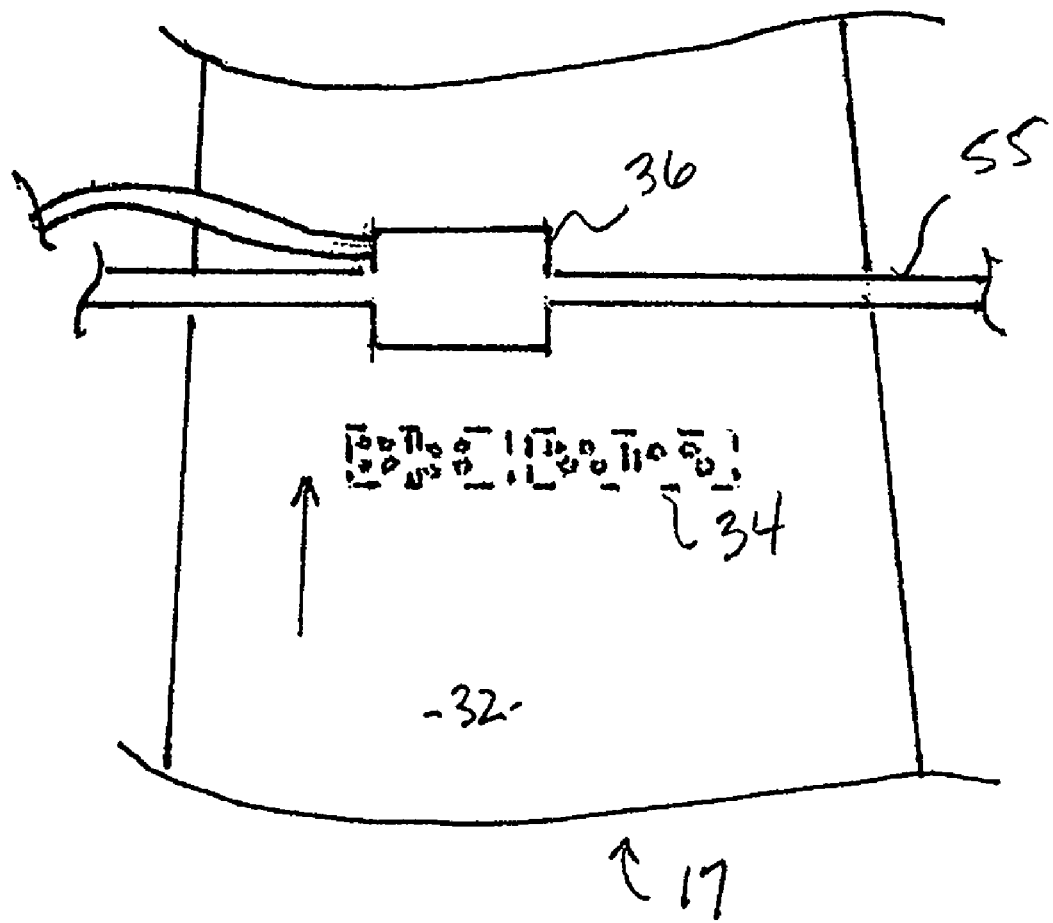
FIG. 9 shows a simplified overhead view of the apparatus of FIG. 8.

FIG. 9 is an essentially overhead view of conveyor belt 32, and components of sensing apparatus 41. In these Figures, the movement of conveyor belt 32 is in normal operation in the direction shown by the arrows. In FIG. 8, camera 36 is mounted on a vertical bracket 57, which is mounted to horizontal member 55, supported by vertical posts 56 attached to respective sides of the frame of conveyor 17.

Method of Operation

In one embodiment, the vacuum packaging machine 1 would be located downstream from a manual, semi-automatic, or fully automatic bagging machine. A fixed input conveyor (not shown) would deliver unsealed loaded bags to the infeed conveyor 17, the loaded bags being oriented such that the unsealed portion of each loaded bag is trailing. In one embodiment, the product is a meat cut.

For the purpose of explanation, presume that the lower vacuum chamber 3b is in the lower operative position and is presently vacuum sealing a loaded bag therein, and the upper vacuum chamber 3a is open and adjacent the infeed conveyor 17, ready to receive a loaded bag.

The infeed conveyor 17 activated to place a loaded bag onto the conveyor 13 on the bed of the vacuum chamber 3a. The trailing unsealed portion of the loaded bag falls onto the lower part of the seal assembly.

Sensing apparatus 41 detects the trailing edge of the product 46 in the unsealed loaded bag 43 as it passes a point on the conveyor 17 where it is located between the overhead camera 36 and the LED's 34 positioned beneath conveyor 17. As the trailing edge 49 of product 46 passes the interrogating view of the IR camera and LED's, the infrared light from the LED's comes into view of the interrogating IR camera. At this point, the IR camera effectively detects the trailing edge of the product, and this is communicated to the other parts of the system to trigger the controlled advance of the bagged product to the seal assembly in the vacuum chamber.

The trailing edge of the product is determined by an internal algorithm in the camera, which converts the IR image that the camera receives to a gray-scale value. The gray-scale value is based on a rectangular field of view as defined by the user for each unique application. The algorithm looks for the percentage of the gray-scale value to fall below a certain number, which indicates that the trailing edge has been captured within the field of view. Once the camera has detected the trailing edge, an output is turned on by the camera and communicated to a programmable logic controller (PLC). The PLC then continues to power the infeed conveyor, via a suitable motive device such as a drive motor on the infeed conveyor, until it is determined that the trailing edge of the product in the loaded bag is in the required position inside the vacuum chamber. The determination of the time required to properly position the loaded bag in the vacuum chamber can be done by any suitable means, such as with timers (knowing the speed of the conveyor and the distance of travel required), or by using encoder pulses on the drive motor to track the distance traveled after the trailing edge is captured, knowing the equivalent distance of linear travel per pulse from the encoder.

The unsealed loaded bag is thus advanced downstream along conveyor 17 and placed inside the open vacuum chamber to a position where the trailing edge 49 of the product inside the loaded bag 43 lies just beyond (i.e. downstream of) the seal assembly 15.

The hood 11 of the upper vacuum chamber 3a can then be closed. The chambers will move to their upper positions, and the lower chamber 3b will be fully depressurized, the chamber then being opened and the packaged product unloaded while the new loaded bag is simultaneously loaded.

In the upper vacuum chamber 3a, the unsealed portion of the loaded bag is spread by the spreading system. The puncturing device is then actuated, such that knives pierce the unsealed portion of the loaded bag while the clamping pins 25 hold it in the spread configuration against the lower clamp bar 29. The spreader bars 19 are then released, and the vacuum chamber 3a is evacuated.

The heat seal anvil 21 then pushes against the heat seal bar 27, heat sealing the package therebetween. The cutting device then shears the scrap portion of the loaded bag between the heat seal bar 27 and the puncturing device. The anvil 21 is then moved away from the heat seal bar 27. When the chamber moves to the unloading position and opens, the sealed loaded bag will be released. The air curtain and suction are then actuated to remove the scrap from the vacuum chamber.

In the meantime, the lower vacuum chamber 3b will have already been loaded with a further unsealed loaded bag. The cycle repeats, with the vacuum chambers moving to their lower positions such that the lower chamber is in the operative position and the upper chamber is in the unloading position.

A commercial example of a conveyor belt 32 is the VOLTA™ FELW-2.0 available from Ammerall Beltech, Inc. In one embodiment, the belt is a homogeneous urethane belt. The belt is routed around the conveyor platen 44. The conveyor platen 44 houses the bank of LED's 34. The bank of LED's 34 includes four sets of infrared lights. A commercial example of LED's is the LEDIA80X80Wm available from Banner Engineering Corp. 9714 Tenth Avenue North, Minneapolis, Minn., USA 55441.

The IR camera is mounted at a sufficient height, in one embodiment 20 inches above the conveyor belt 32, to view the necessary viewing area in conjunction with the appropriate light filter 38 and camera lens 40. A commercial example of an IR camera is PRESENCEPLUS™ P4AR. A commercial example of an IR filter is FLT1™. A commercial example of a lens is LCF04™ P4AR. All three are available from Banner Engineering Corp.

Examples/Testing

Test No. 1

Testing was done on a product handling conveyor driven by a three phase AC motor (3450 rpm) coupled to a 10:1 gearbox controlled by a Yaskawa V7™ VFD in open loop vector mode. The components used were:

| Component | Part No. |
|---|---|
| Yaskawa V7 ™ drive | CIMR-V7AM40P4 ™ |
| Banner VISION SENSOR ™ | P4AR ™ |
| Banner IR light | LEDIA80X80W ™ |
| Banner IR filter | FLT1 ™ |
| Banner 4 mm lens | LCF04 ™ |
| Banner Register Mark Sensor | R58E ™ |
| Banner T18 ™ series emitter/receiver | T18EQ/T18SP6RQ ™ |
| MicroLogix 1500 ™ | 1764-LRP ™ |
| High Speed Counter Module | 1769-HSC ™ |
| Output Module | 1769-OB16 ™ |
| Volta urethane white belt | FELW-2.0 ™ |

This test used the vision sensor to detect the trailing (upstream) edge of the meat product and stop the conveyor after a fixed time delay that the placed the product under a laser line for measurement. The conveyor speed was set to 1 meter/second with an S-curve accelerate/decelerate of 0.4 seconds. The stop command for the drive was controlled from the High Speed Counter Module. The belt was a food-grade white urethane belt from Volta. The infrared LED lighting was placed under the belt directly beneath the vision sensor to enable the vision sensor when product was present. (see FIGS. 8 and 9). The vision sensor was placed vertically looking down at the conveyor. The Volta belt was transparent to the IR light, allowing the vision sensor to detect the trailing edge of the meat product. The meat product, on the other hand, blocks the IR light, leaving a silhouette of the meat product visible to the sensor.

The system was tested using twelve bag/product combinations. B1 was a printed bag with dimensions of 12"×20". B2 was a clear bag with dimensions of 13.5"×21". B3 was a printed bag with dimensions of 12"×22". B4 was a bag with dimensions of 14"×24". P1 through P4 represent various meat products/meat cuts. P1 had the dimensions 17" long×9" wide×4.38" high. P2 had the dimensions 12.5" long×8.38" wide×6.38" high. P3 had the dimensions 9.5" long×7.5" wide×5.5" high. P4 had the dimensions 9" long×4.88" wide× 5.5" high. Thirty samples of each bag/product combination were recorded. The standard deviation and error were calculated from this data. The result was that the error for the entire population was 0.655 inches, or 16.63 mm.

Test No. 2

Incorporating an equipment arrangement like that for Test No. 1, an IR camera with a bank of small LED lights was arranged in a vertical fashion to sense the product profile. The LED's were placed below in the infeed conveyor frame underneath a conveyor belt that is transparent to the IR light spectrum.

The product detection test involved seven (7) different bag types, using two (2) different products. The product detection system was able to recognize product through all seven bag samples. However, the product detection system required two different system settings, one for standard bags and one for dark colored bags. The standard setting applied a typical gain and exposure time, while the dark bag setting involved a high gain and exposure time. The following table summarizes the results of the product detection test.

The test utilized the following components:

| Item | Part Number |
| --- | --- |
| Banner Vision Sensor | P4AR |
| Banner IR Light (x4) | LEDIA80X80W |
| Banner 4 mm Lens | LCF04 |
| Banner I/O Cable | P4C23 |
| Banner IP67 Enclosure Custom Encl. for IR Lights | P4RE67-P |
| Volta Conveyor Belt | FELW-2.0 |

The test involved running product underneath the product detection sensor and ascertaining if the sensor would correctly identify the end of the product through the bag and typical wrinkles.

As stated previously the two different IR camera system settings involved the gain and the exposure time. Both parameters had to be increased to identify product through the dark colored bag. With the increased values for gain and exposure time the camera's optics passed through the lighter colored bags as if they were completely transparent.

The test involved simply running the different bag/product combinations through the camera field and determining whether the camera's software could recognize the end of the product.

| Bag | Setting 1 | Setting 2 |
| --- | --- | --- |
| Clear Bag | Yes | no |
| Boneguard Bag | Yes | no |
| Small Printed Bag | Yes | no |
| Large Printed Bag | Yes | no |
| Red Colored Bag | Yes | no |
| Gold Metallic Colored Bag | Yes | no |
| Black Colored Bag | No | yes |

Test No. 3

Incorporating an equipment arrangement like that for Test Nos. 1 and 2, product placement accuracy was tested for 20 to 30 pound chuck rolls. The results are shown in the following table. The left-hand column shows the speed of the conveyor; the middle column shows the number of samples, out of the total samples run, that placed within plus or minus 50 mm of the target position of the bagged meat product; and the right-hand column shows the number of samples, out of the total samples run, that placed within plus or minus 25 mm of the target position of the bagged meat product. For example, of 101 loaded bags run on the conveyor at 750 millimeters/second, 101 placed within 50 mm of the target position.

| Velocity of conveyor | +/−50 mm | +/−25 mm |
| --- | --- | --- |
| 500 mm/second | 100/100 | 100/100 |
| 750 mm/second | 101/101 | 100/100 |
| 1000 mm/second | 101/101 | 98/100 |

Any suitable bag formulations, especially those made from thermoplastic films such as olefinic films with or without oxygen barrier functionality, can be used with benefit in this invention. These films are made by extrusion coating, coextrusion, lamination, or other suitable processes. Especially preferred for many applications are films comprising an outer layer, an intermediate layer, and an inner layer. The materials of the outer layer are often chosen for abuse resistance and/or sealability, and can be chosen from any suitable polymeric materials such as polyolefins, especially ethylenic polymers and copolymers, polypropylene, polyesters, polyamides, and the like. The inner layer materials, often chosen for sealability, can be any of the materials described for the outer layer. The intermediate layer materials are often chosen for their barrier qualities (i.e. barriers to oxygen, moisture, carbon dioxide, etc.). Preferred materials include polyvinylidene chloride polymers and copolymers, ethylene vinyl alcohol copolymer, polyvinyl alcohol, polyamide, polyester, acrylonitrile, and the like. Bags are in one embodiment heat shrinkable, and in one embodiment at least partially crosslinked.

"Loaded" herein refers to a bag in which a product, such as a meat product, has been placed manually, mechanically, or otherwise. "Loaded" does not necessarily mean "filled", as conventional bagged meat packages can have some empty voids or spaces within the bag interior even after loading the bag.

Although the invention has been described primarily with respect to meat products, those skilled in the art will understand, after a review of this disclosure, that the invention can be used with benefit for packaging other products as well, both food products such as cheese, and non-food products.

TASVAC Embodiments

With respect to embodiments where the present invention is used in conjunction with packaging systems similar to the TASVAC system described above, having a transverse heat seal assembly in each vacuum chamber enables the loaded bags to be loaded into each chamber with their openings transverse to the longitudinal direction. This orientation corresponds to the orientation of the packages as they exit most manual bagging stations or automatic packaging systems, which would generally be upstream of the vacuum packaging machine.

The heat seal assembly in each vacuum chamber can include a heat seal bar. Additionally, each heat seal assembly may include a heat seal anvil.

The machine may include vacuum chambers which are arranged generally vertically one above each other The machine can be configured to operate one of the vacuum chambers to perform the vacuum sealing operation while another of the vacuum chambers is open for feeding and unloading of loaded bag(s).

The vacuum packaging machine may include or be in combination with a conveyor arrangement configured to feed and/or unload loaded bags to and/or from the vacuum chambers.

The conveyor arrangement suitably includes at least one infeed conveyor operable to feed to a selected vacuum chamber at least one loaded bag. The heat seal assembly in each vacuum chamber can be located at or adjacent the end of the chamber adjacent the infeed conveyor(s), and the infeed conveyor(s) is/are configured to feed the loaded bag(s) into the chamber with the unsealed portion(s) of the package(s) trailing. The infeed conveyor(s) may have a telescoping portion which is operable to telescope over the heat seal assembly or a part of the heat seal assembly in a vacuum chamber to feed the loaded bag(s) into the vacuum chamber such that an unsealed portion of the loaded bag(s) is located over the heat seal assembly or part thereof, and to then retract from the chamber to allow the chamber to close to perform the vacuum sealing operation.

The infeed conveyor(s) can be moveable relative to the vacuum chambers to enable selective feeding of loaded bags into more than one chamber. Alternatively, the vacuum chambers may be moveable relative to the infeed conveyor(s) to enable selective feeding of more than one chamber.

Each vacuum chamber can include an internal conveyor, which is moveable in the longitudinal direction of the vacuum chamber to expel the product package(s) from the vacuum chamber following a vacuum sealing operation. A portion of the internal conveyor may extend under the heat seal assembly or a part of the heat seal assembly in each vacuum chamber. The vacuum chambers can each include a vacuum chamber hood and wherein a portion of the internal conveyor in each vacuum chamber extends under the vacuum chamber hood thereof.

The heat seal assembly or a part thereof may be retractable to enable loaded bags to be moved past the heat seal assembly on the internal conveyor, and the telescoping conveyor may be substantially vertically aligned with the internal chamber conveyor in a loaded bag feeding configuration.

The conveyor arrangement can include at least one outfeed conveyor operable to unload the loaded bag(s) from a selected vacuum chamber. The vacuum chambers may be moveable relative to the outfeed conveyor(s) to enable selective unloading of more than one chamber.

The conveyor arrangement can be operable to substantially simultaneously load an unsealed loaded bag into a selected vacuum chamber and unload another recently-sealed loaded bag from the selected vacuum chamber.

The machine can include two vertically-stacked vacuum chambers, an infeed conveyor and an outfeed conveyor, the vacuum chambers being synchronously vertically moveable between a feeding/unloading position adjacent and between the infeed and outfeed conveyor and an operating position spaced from the infeed and outfeed conveyor, the machine being operable such that as one vacuum chamber is performing the vacuum sealing operation, the other vacuum chamber is open for feeding/unloading.

The machine can further include a puncturing device which is operable to puncture at least one aperture in the loaded bag(s) adjacent the heat seal assembly, so that as each vacuum sealing operation occurs, air is forced out of the package through the punctured aperture(s) prior to heat sealing. The puncturing device may comprise a plurality of piercing knives.

The sealing mechanism may be part of a wrapping or bagging machine.

In one embodiment, the heat seal assembly can include a clamping device and the vacuum sealing operation includes clamping the unsealed part(s) of the loaded bag(s) prior to evacuation and heat sealing.

In one embodiment, the machine can include a cutting device arranged to cut the loaded bag(s) between the heat seal assembly and the puncturing device, and the vacuum sealing operation can include cutting the package(s) following evacuation and heat sealing.

What is claimed is:

1. A method of positioning a loaded bag in a vacuum chamber comprising
    a) loading a flexible polymeric bag by placing a meat or cheese product in the flexible polymeric bag, the bag made from a material that is transparent to infrared radiation, and wherein the polymeric bag has at an upstream end thereof a bag mouth;
    b) placing the loaded bag on an infeed conveyor that is transparent to infrared radiation;
    c) advancing the loaded bag, on the infeed conveyor, to a sensing apparatus comprising an infrared camera disposed above the conveyor, and a bank of light emitting diodes disposed below the conveyor;
    d) interrogating the bank of light emitting diodes, through the loaded bag, using the sensing apparatus, with infrared radiation to detect the trailing edge of the meat or cheese product inside the loaded bag;
    e) transmitting information acquired from the interrogating step to a programmable logic controller;
    f) advancing the interrogated loaded bag a distance, based in the information acquired from the interrogating step, to a vacuum chamber comprising a heat seal assembly; and
    g) heat sealing the loaded bag with the heat seal assembly to close the bag mouth.

2. The method of claim 1 wherein the method comprises heat sealing the loaded bag such that the distance between the heat seal and the trailing edge of the meat or cheese product is less than 1.5 inches.

3. The method of claim 1 wherein the method comprises heat sealing the loaded bag such that the distance between the heat seal and the trailing edge of the meat or cheese product is less than 1 inch.

4. The method of claim 1 wherein the method is performed in combination with a method of vacuum sealing a loaded bag, the method comprising providing a vacuum packaging machine having a plurality of vacuum chambers, each of the vacuum chambers being arranged to receive an unsealed loaded bag and operable to perform a vacuum sealing operation on the loaded bag, each vacuum chamber having a longitudinal direction defined by a path of travel of the respective loaded bag through the chamber, each vacuum chamber having a heat seal assembly for forming a heat seal across a bag mouth of a respective loaded bag, the heat seal disposed transversely to said longitudinal direction; feeding an unsealed loaded bag into one of the vacuum chambers, such that the bag mouth of the loaded bag is located over a portion of the heat seal assembly; and performing a vacuum sealing operation on a loaded bag in another one of the vacuum chambers.

5. The method of claim 1 wherein the meat or cheese product comprises a meat product with an irregular shape.

6. The method of claim 1 wherein the heat seal assembly in the vacuum chamber is located at or adjacent the end of the chamber adjacent the infeed conveyor, and the infeed conveyor is configured to load the respective loaded bag into the chamber with the unsealed portion of the package trailing.

7. The vacuum packaging machine of claim 1 wherein the infeed conveyor has a telescoping portion operable to telescope over a portion of the heat seal assembly in the vacuum chamber to load the loaded bag into the vacuum chamber such that an unsealed portion of the loaded bag is located over a portion of the heat seal assembly, and to then retract from the chamber to allow the chamber to close to perform the vacuum sealing operation.

8. The method of claim 4 wherein the plurality of vacuum chambers are moveable relative to the infeed conveyor to enable selective feeding of loaded bags into more than one chamber.

9. The method of claim 1 wherein the vacuum chamber comprises an internal conveyor moveable in the longitudinal direction of the vacuum chamber to expel the respective loaded bag from the vacuum chamber following the vacuum sealing operation.

10. The method of claim 9 wherein a portion of the internal conveyor extends under a portion of the heat seal assembly in each vacuum chamber.

11. The method of claim 9 wherein at least a portion of the heat seal assembly is retractable to enable a loaded bag to be moved past the heat seal assembly on the internal conveyor, and the telescoping conveyor is substantially vertically aligned with the internal chamber conveyor in a loaded bag feeding configuration.

12. The method of claim 1 wherein the infrared camera is disposed above the conveyor, and is disposed vertically above the bank of light emitting diodes.

13. The method of claim 1 wherein, during the interrogating step, the loaded bag is advanced along the in-feed conveyor.

14. The method of claim 4 wherein, simultaneously with feeding an unsealed loaded bag into one of the vacuum chambers, such that the bag mouth of the loaded bag is located over a portion of the heat seal assembly, a vacuum sealing operation is performed on a loaded bag in another one of the vacuum chambers.

* * * * *